United States Patent Office 3,573,209
Patented Mar. 30, 1971

3,573,209
INSULATING COMPOSITIONS AND MATERIALS
Robert de Dryver and André Marter, Notre-Dame-de-Gravenchon, France, assignors to Esso Standard Societe Anonyme Francaise, Paris, France
No Drawing. Filed July 14, 1964, Ser. No. 400,296
Claims priority, application France, July 22, 1963, 942,259
(Filed under Rule 47(a) and 35 U.S.C. 116)
Int. Cl. H01b 3/00
U.S. Cl. 252—63                                    5 Claims This invention relates to oily compositions for electrical insulation and to insulating materials formed by impregnating supports such as paper or other fibrous material with the oil compositions. Such insulators find application, for example, in the manufacture of electrical cables and condensers.

Oily compositions, suitable for the impregnation of fibrous materials to form electrical insulators should have high viscosity at low temperatures, e.g. at 50° C., so that the oily composition does not migrate, or flow, at normal temperatures of use of the insulating material, and should have low viscosity at high temperatures, e.g. 100° C., so that unduly high impregnating temperatures are not required. Other desired properties are good di-electric properties at the temperatures of operation, resistance to oxidation and ageing, low acidity to avoid corrosive attack on metal parts and the ability not to liberate hydrogen when the oily compositions are subjected to high potential gradients.

Pure mineral oils do not provide desired viscosity characteristics, e.g. from about 2500 to 2800 centistokes at 50° C. and a maximum of 150 centistokes at 100° C., nor do they have the desired di-electric properties, i.e. tan $\delta$ (tangent of loss angle) at 100° C. of less than 0.0100 and increase of tan $\delta$ of less than 100% after bubbling air through the oil for three hours at 125° C. and decline in resistivity at 100° C. of less than 50% after the same treatment.

The addition of colophony wax to mineral oils has been tried in order to fulfil the above requirements but has proved unsatisfactory because, whilst its thickening power at low temperatures is high, its dielectric properties and stability to ageing are poor; moreover it has a high acid number.

Polybutenes have both high thickening power and good di-electric properties but, in contrast to colophony wax, this thickening power is manifest at high temperatures and requires high impregnating temperatures. This disadvantage can, in part, be remedied by using highly viscous mineral oils of low viscosity index so as to need the incorporation of only minimal amounts of polybutenes but such oils are difficult to prepare because the standard refining processes used to improve their di-electric properties and ageing stability have the effect of concentrating the hydrocarbons, showing a good viscosity curve, in the raffinate.

It has now been discovered that oil compositions having the desired characteristics, as hereinbefore set out, may be prepared by adding a petroleum resin to the mineral oil and that improved insulating materials may be produced by impregnating paper or other fibrous materials with such oily compositions. In a preferred form of the invention there is added, additionally, to the oil composition a quantity of a polyolefin hydrocarbon.

The petroleum resins are thermoplastic resins obtained by polymerisation, in the presence of a Friedel-Crafts catalyst, of steam cracked petroleum distillates, or fractions of such distillates, boiling in the range of 30 to 280° C. The polymerisation is performed at temperatures which generally range from 0 to 70° C., preferably from 10 to 55° C. Instead of cracked petroleum distillates the charge to be polymerised may consist of a mixture of olefins and diolefins but the mixture must then contain sufficient diolefins to obtain a resin and not an oil nor a rubbery polymer. These resins are polydienic in character, are generally of pale colour, and have a ring and ball softening point ranging from 50 to 180° C.

Polyolefins, which are added in the preferred form of the invention, are preferably polymers of $C_2$ to $C_5$ monoolefins, for example of ethylene, propylene, butene, isobutylene or isoprene.

The basic oil may be a naphthenic, semi-paraffinic or paraffinic oil and is selected from oils that have suitable di-electric properties (tangent and resistivity) for the use in question.

The petroleum resin is suitably added to the basic oil in an amount of from 0.1 to 50% by weight and up to 15% by weight of the polyolefin may be suitably incorporated. If desired there may also be added, petrolatum, paraffins or microcrystalline waxes and/or additives such as anti-oxidising agents, for example bis-phenols or aminophenols, and metal deactivators. The amounts of these ingredients are suitably in the range of from 0.1 to 2.0% by weight.

The invention is further illustrated by reference to the following examples.

EXAMPLES

Oil compositions were prepared from:
(1) A semi-naphthenic oil "A"
(2) A polybutene "P" of molecular weight 100,000
(3) A petroleum resin "R" having the following characteristics:

Ring and ball softening point—92.5° C.
Gardiner Colour (in 50% toluene solution)—9.5
Molecular weight—1325

The following oil compositions were prepared from the foregoing:

B: 70 wt. percent of oil "A"+30 wt. percent colophony wax
C: 98.8 wt. percent of oil "A"+1.2 wt. percent polybutene "P"
D: 74 wt. percent of oil "A"+26 wt. percent of resin "R"
E: 76.7 wt. percent of oil "A"+23 wt. percent of resin "R"+0.3 wt. percent polybutene "P"

The characteristics of these oily compositions were determined before and after ageing by bubbling air through them for 3 hours at 125° C.

A hydrogen absorption test was also carried out using the Pirelli method; this method consists in subjecting the oil to a voltage of 16 kv. at 80° C. for 5 hours in a hydrogen atmosphere and determining the amount of hydrogen absorbed.

The results obtained are shown in the following table.

TABLE

|  | Oil "A" | | Composition "B" | | Composition "C" | | Composition "D" | | Composition "E" | |
| --- | --- | --- | --- | --- | --- | --- | --- | --- | --- | --- |
| Appearance | | | | | | | | | | |
|  | Bright, limpid, transparent | | Bright transparent | | Bright, limpid, transparent stringy | | Bright, limpid, transparent | | Liquid, transparent, stringy | |
| Colour | | | | | | | | | | |
|  | Orange, green reflection | | Orange, green reflection | | Orange, green reflection | | Orange, green reflection | | Orange, green reflection | |
| Hydrogen absorption, c.c. | | | | | | | | | | |
|  | 0.5 | | 0.5 | | 0.11 | | 0.55 | | 0.31 | |
|  | Original | After ageing | Original | After ageing | Original | After ageing | Original | After ageing | Original | After ageing |
| Viscosity in centistokes: | | | | | | | | | | |
| At 90° C | 45.3 | 46.3 | 2,389 | 2,881 | 2,720 | 2,720 | 2,700 | 2,890 | 2,750 | 2,795 |
| At 98.9° C | 42.5 | 42.9 | 86.9 | 97.7 | 242 | 239 | 125.7 | 130.9 | 148 | 148.5 |
| Acid index (Mg. KOH/gm.) | Trace | 0.1 | 33 | 50 | Trace | Trace | Trace | Trace | Trace | Trace |
| Tan Δ at 100° C | 0.0034 | 0.0057 | 0.0245 | 0.0550 | 0.0071 | 0.0153 | 0.0061 | 0.0120 | 0.0087 | 0.0130 |
| Resitivity at 100° C., 10 ohms/cm./cm.² | 5.99 |  | 0.27 | 0.10 | 2.53 | 1.21 | 2.7 | 1.5 | 2.07 | 1.37 |

The table shows the particularly interesting results obtained with the only compositions in accordance with the invention, namely compositions D and E.

Paper or other fibrous materials are impregnated, in known manner per se, with the only compositions of the invention to prepare insulating materials suitable for condensers, and other electrical insulating applications.

What is claimed is:

1. An oil composition suitable for the impregnation of tri-fibrous paper materials to form electrical insulators, said composition having a viscosity at 50° C. of about 2500 to about 2800 centistokes, a maximum viscosity at 100° C. of 150 centistokes, a tangent of loss angle at 100° F. of less than 0.0100, an increase of tangent of loss angle less than 100% and a decline in resistivity at 100° C. of less than 50% after bubbling air through the oil composition for 3 hours at 125° C., said composition tri-consisting essentially of a major amount of a mineral oil selected from the group consisting of naphthenic, semi-paraffinic and paraffinic oils, and within the range of 0.1 to 50 wt. percent of a thermoplastic petroleum resin having a softening point in the range of 50° to 180° C., said resin being obtained by polymerizing a steam cracked petroleum distillate, or fraction thereof, boiling in the range of 30° to 280° C., in the presence of a Friedel-Crafts catalyst.

2. An oil composition according to claim 1, which composition also contains up to 15 wt. percent of a polybutene having a molecular weight of about 100,000.

3. A composition suitable for the impregnation of tri-fibrous paper materials to form electrical insulators, said composition having a viscosity at 50° C. of about 2500 to about 2800 centistokes, a maximum viscosity at 100° C. of 150 centistokes, a tangent of loss angle at 100° F. of less than 0.0100, an increase of tangent of loss angle less than 100% and a decline in resistivity at 100° C. of less than 50% after bubbling air through the oil for 3 hours at 125° C., said composition tri-consisting essentially of a major amount of a semi-naphthenic mineral oil, about 23 wt. percent of petroleum resin having a softening point of about 92° C. obtained by polymerizing a steam cracked petroleum distillate or fraction thereof, boiling in the range of 30° to 280° C., in the presence of a Friedel-Crafts catalyst, and about 0.3 wt. percent of polybutene of about 100,000 molecular weight.

4. A method of improving the electrical insulating properties of tri-fibrous paper materials which comprises impregnating them with the composition of claim 1.

5. An electrical insulating material which consists essentially of paper impregnated with oil composition defined in claim 1.

References Cited

UNITED STATES PATENTS 2,075,410   3/1937   Thompson _____ 208—14

FOREIGN PATENTS 2,127/1960   3/1960   Japan _____ 252—63

JOHN D. WELSH, Primary Examiner

U.S. Cl. X.R.

208—14